United States Patent
Zhang et al.

(10) Patent No.: US 10,655,445 B2
(45) Date of Patent: May 19, 2020

(54) NON-RADIOACTIVE TRACERS TO EVALUATE FRACTURING PROCEDURES

(71) Applicant: CARBO CERAMICS INC., Houston, TX (US)

(72) Inventors: Jeremy Zhang, Katy, TX (US); Harry D. Smith, Jr., Spring, TX (US)

(73) Assignee: CARBO CERAMICS INC., Houston, TX (US)

( * ) Notice: Subject to any disclaimer, the term of this patent is extended or adjusted under 35 U.S.C. 154(b) by 75 days.

(21) Appl. No.: 15/831,081

(22) Filed: Dec. 4, 2017

(65) Prior Publication Data
US 2019/0170897 A1    Jun. 6, 2019

(51) Int. Cl.
| | |
|---|---|
| *E21B 43/267* | (2006.01) |
| *G01V 5/10* | (2006.01) |
| *E21B 43/26* | (2006.01) |
| *E21B 47/10* | (2012.01) |

(52) U.S. Cl.
CPC ............ *E21B 43/267* (2013.01); *E21B 43/26* (2013.01); *E21B 47/1015* (2013.01); *G01V 5/102* (2013.01); *G01V 5/108* (2013.01)

(58) Field of Classification Search
None
See application file for complete search history.

(56) References Cited

U.S. PATENT DOCUMENTS

| | | | |
|---|---|---|---|
| 5,413,179 A | 5/1995 | Scott, III | |
| 5,543,617 A * | 8/1996 | Roscoe | G01F 1/708 |
| | | | 250/259 |
| 2012/0080588 A1 * | 4/2012 | Smith, Jr. | G01V 5/101 |
| | | | 250/269.6 |
| 2013/0292109 A1 | 11/2013 | Smith, Jr. et al. | |
| 2015/0377011 A1 * | 12/2015 | Torres-Verdín | C09K 8/032 |
| | | | 250/259 |
| 2016/0024909 A1 | 1/2016 | Han et al. | |
| 2016/0333689 A1 | 11/2016 | Eick et al. | |

FOREIGN PATENT DOCUMENTS

WO    2016/144355 A1    9/2016

OTHER PUBLICATIONS

International Search Report and Written Opinion for International Application No. PCT/US18/63081 dated Feb. 5, 2019.

\* cited by examiner

*Primary Examiner* — Andrew Sue-Ako
(74) *Attorney, Agent, or Firm* — Patterson + Sheridan, LLP

(57) ABSTRACT

A method for evaluating induced fractures in a wellbore includes obtaining a first set of data in a wellbore using a downhole logging tool. A first proppant is pumped into the wellbore, after the first set of data is captured. The first proppant includes a first tracer that is not radioactive. A second proppant is also pumped into the wellbore, after the first proppant is pumped into the wellbore. The second proppant includes a second tracer that is not radioactive, and the second tracer is different than the first tracer. A second set of data is obtained in the wellbore using the downhole tool after the first and second proppants are pumped into the wellbore. The first and second sets of data are compared.

11 Claims, 7 Drawing Sheets

COMPARISON OF Gd, B AND Sm TAGGED PROPPANT ON PNC LOGS

| TRACER | CONCENTRATION | d(Σbh_NEAR) | d(Σfm_NEAR) | d(ΣCR_NEAR) 50-150 µS | d(ΣCR_NEAR) 200-1000 µS | d(ΣCR_NEAR) 400-1000 µS | d(CR_NEAR)/ d(CR_NEAR) 50-150 µS/ 200-1000 µS |
|---|---|---|---|---|---|---|---|
| Gd2O3 | 0.4% | 7.8% | 10.0% | 7.3% | -11.5% | -21.0% | -0.635 |
| B4C | 1.0% | 2.5% | 9.5% | -6.2% | -23.2% | -32.0% | 0.267 |
| Sm2O3 | 1.5% | 7.4% | 10.0% | 8.0% | -10.5% | -20.0% | -0.762 |

NON-RADIOACTIVE TRACERS TO EVALUATE FRACTURING PROCEDURES

TECHNICAL FIELD

The present disclosure relates to tracers for evaluating fracturing procedures. More particularly, the present disclosure relates to identifying multiple non-radioactive tracer-tagged proppants in a wellbore.

BACKGROUND

Radioactive tracers, such as Ir-192, Ir-194, Sc-46, Sb-124, Sb-122, Na-24, I-131 etc., are currently used to evaluate multiple fracturing procedures conducted in a wellbore. More particularly, different tracers are used in multiple fracturing procedures to determine which perforation is opened and further fractured during each fracturing procedure.

Due to an inherited uneven mixing issue, the signals from radioactive tracers tend to fluctuate, making them difficult to detect accurately. In addition, it may be difficult to differentiate tracers inside the wellbore from tracers deep inside the subterranean formation. Moreover, due to their potentially hazardous properties, radioactive tracers have been strictly regulated to protect the health and safety of the public and the environment. As a result, the evaluation of fractures in the subterranean formation may not be reliable, especially for horizontal wellbores, where radioactive tracers may settle along the bottom of the wellbore in the horizontal portion.

More recently, non-radioactive tracers have been implemented. The non-radioactive tracers are used to tag a proppant that is pumped into the wellbore during a fracturing procedure. The tagged proppant may be evaluated two different ways. The first method measures detector count rates of the tagged proppant using a compensated neutron (CNT) logging tool, or measures count rates and the decay of pulsed neutrons using a pulsed neutron capture (PNC) logging tool, to locate tagged proppant in the wellbore in induced fractures, gravel packs, frac-packs, and cement. The second method measures capture gamma ray spectroscopy using a PNC logging tool and spectrally resolves the capture gamma rays emanating from the tagged proppant from the capture gamma rays coming from other downhole elements. These techniques have been disclosed in U.S. Pat. Nos. 8,100,177, 8,648,309, 8,805,615, and 9,038,715. Although a single non-radioactive tracer-tagged proppant has been used for evaluating the fracture height or gravel pack quality, there is a need for a method to detect and measure multiple (e.g., different) non-radioactive tracers to evaluate multiple fracture procedures for the same stage or different stages of a wellbore, as well as how the logging procedures are performed and how the logs are evaluated.

BRIEF SUMMARY

A method for evaluating induced fractures in a wellbore is disclosed. The method includes obtaining a first set of data in a wellbore using a downhole logging tool. A first proppant is pumped into the wellbore, after the first set of data is captured. The first proppant includes a first tracer that is not radioactive. A second proppant is also pumped into the wellbore, after the first proppant is pumped into the wellbore. The second proppant includes a second tracer that is not radioactive, and the second tracer is different than the first tracer. A second set of data is obtained in the wellbore using the downhole tool after the first and second proppants are pumped into the wellbore. The first and second sets of data are compared.

In another embodiment, the method includes pumping a first proppant into the wellbore. The first proppant includes a first tracer that is not radioactive. A second proppant is also pumped into the wellbore, simultaneously with or after the first proppant is pumped into the wellbore. The second proppant includes a second tracer that is not radioactive, and the second tracer is different than the first tracer. A set of data is obtained in the wellbore using a downhole logging tool after the first and second proppants are pumped into the wellbore. The set of data is analyzed to determine locations of the first and second proppants in formation fractures.

In another embodiment, the method includes obtaining a first set of data in a wellbore using a downhole tool. A frac fluid and a proppant are pumped into the wellbore simultaneously, after the first set of data is captured. The frac fluid includes a first tracer that is not radioactive, and the proppant includes a second tracer that is not radioactive. A second set of data is obtained in the wellbore using the downhole tool after the frac fluid and the proppant are pumped into the wellbore. The first and second sets of data are compared to determine locations of the frac fluid the said proppant.

A method for evaluating gravel packs or frac packs in a wellbore is also disclosed. The method includes pumping a first proppant into the wellbore. The first proppant includes a first tracer that is not radioactive. A second proppant is also pumped into the wellbore, simultaneously with or after the first proppant is pumped into the wellbore. The second proppant includes a second tracer that is not radioactive, and the second tracer is different than the first tracer. A first set of data is obtained in the wellbore using a downhole logging tool after the first and second proppants are pumped into the wellbore. The first set of data is analyzed to determine locations of the first and second proppants in a gravel pack region in the wellbore, in induced formation fractures, or both.

BRIEF DESCRIPTION OF THE DRAWINGS

The present invention may best be understood by referring to the following description and accompanying drawings that are used to illustrate embodiments of the invention. In the drawings:

FIG. 8 is a table showing modeled changes on pulsed neutron logging borehole sigma, formation sigma, detector count rates in different time windows, and a ratio of detector count rate changes in two time windows (e.g. 50-150 μs and 200-1000 μs) for a Gd-tagged proppant, a B-tagged proppant, and a Sm-tagged proppant in a fractured formation, according to an embodiment.

DETAILED DESCRIPTION

Figure 1:
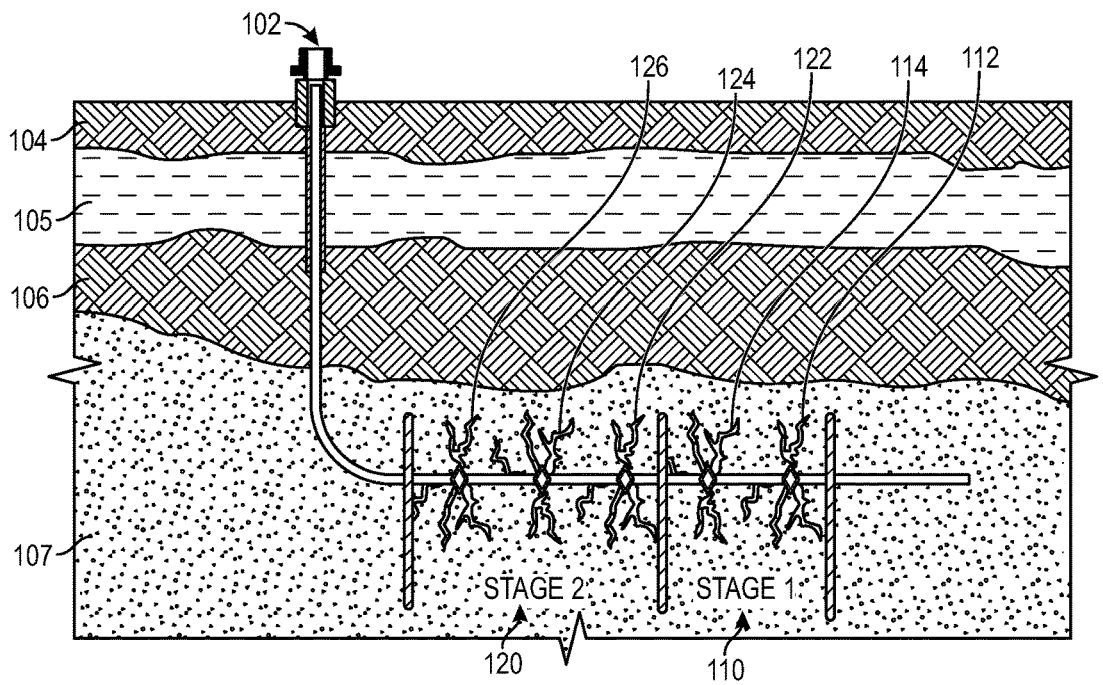
FIG. 1 is a schematic view of a two-stage fracturing treatment in a wellbore, according to an embodiment.

The present disclosure is directed to systems and methods for detecting and identifying multiple (e.g., different) non-radioactive tracer-tagged proppants and/or frac fluids (and in some embodiments non-radioactive tagged proppants/fluids in combination with radioactively tagged materials) in induced formation fractures in a wellbore using a pulsed neutron capture (PNC) tool. FIG. 1 is a schematic view of a two-stage fracturing treatment in a wellbore 102, according to an embodiment. The wellbore 102 may extend into a subterranean formation having one or more layers. For example, the wellbore 102 may include a substantially vertical portion that extends downward through a first formation layer 104, a second formation layer 105, a third formation layer 106, and a reservoir layer 107. The wellbore 102 may also include a substantially horizontal portion (e.g., in the reservoir layer 107).

The wellbore 102 may be cased or uncased and perforated and/or fractured in one or more stages. As shown, the horizontal portion of the wellbore 102 may be perforated and/or fractured in two stages: a first stage 110 and a second stage 120. The first stage 110 may be positioned below (e.g., farther from the origination point of the wellbore 102 than) the second stage 120. The first stage 110 may be perforated and/or fractured before the second stage 120.

The first stage 110 may include one or more sets of perforations (two are shown: 112, 114). The first set of perforations 112 may be axially offset from the second set of perforations 114 with respect to the axis along the wellbore 102. For example, the first set of perforations 112 may be positioned below (e.g., farther from the origination point of the wellbore 102 than) the second set of perforations 114. The first set of perforations 112 may be generated before or at the same time as the second set of perforations 114. After the first and second sets of perforations 112, 114 are formed, a first fracturing procedure may be initiated. The first fracturing procedure may include pumping a first non-radioactive-tagged proppant into the wellbore 102. As used herein, the term "non-radioactive-tagged proppant" refers to a proppant that is tagged by a tracer material that is not radioactive and has a high thermal neutron capture cross-section. The tracer in the first non-radioactive-tagged proppant may be or include, for example, gadolinium (Gd). For example, the tracer may be or include $Gd_2O_3$. After the first fracturing procedure is completed, a second fracturing procedure may be initiated. The second fracturing procedure may include pumping a second non-radioactive-tagged proppant into the wellbore 102. In one embodiment, the first fracturing procedure may contain tagged proppant particles of one size (mesh), and the following treatment may contain tagged proppant particles of a different size (mesh). The tracer in the second non-radioactive-tagged proppant may be different from the first non-radioactive-tagged proppant. The tracer in the second non-radioactive-tagged proppant may be or include, for example, boron (B). For example, the tracer may be or include $B_4C$. The two non-radioactively tagged proppants may also be employed in a single frac procedure where an initial portion of the treatment contained one tag material and a second portion contains the second tag material.

As described in more detail below, if the first non-radioactive-tagged proppant (e.g., the Gd-tagged proppant) is found in the fracture induced by the first set of perforations 112, and the second non-radioactive-tagged proppant (e.g., the B-tagged proppant) is found in the fracture induced by the second set of perforations 114, it may be determined that the first set of perforations 112 was opened/fractured by the first non-radioactive-tagged proppant before the second set of perforations 114 was opened/fractured by the second non-radioactive-tagged proppant. However, if the first non-radioactive-tagged proppant (e.g., the Gd-tagged proppant) is found in the fracture induced by the second set of perforations 114, and the second non-radioactive-tagged proppant (e.g., the B-tagged proppant) is found in the fracture induced by the first set of perforations 112, then it may be determined that the second set of perforations 114 was opened/fractured by the first non-radioactive-tagged proppant before the first set of perforations 112 was opened/fractured by the second non-radioactive-tagged proppant.

The second stage 120 may also include one or more sets of perforations (three are shown: 122, 124, 126). For example, the third set of perforations 122 may be positioned below (e.g., farther from the origination point of the wellbore 102 than) the fourth set of perforations 124, and the fourth set of perforations 124 may be positioned below the fifth set of perforations 126. After the third, fourth, and fifth sets of perforations 122, 124, 126 are formed, a third fracturing procedure may be initiated. The third fracturing procedure may be the first fracturing procedure in the second stage 120. The third fracturing procedure may include pumping a third non-radioactive-tagged proppant into the wellbore 102. The tracer in the third non-radioactive-tagged proppant may be the same as or different from the tracers in the non-radioactive-tagged proppants used in the first stage 110. For example, the tracer in the third non-radioactive-tagged proppant may be or include, for example, gadolinium (Gd). For example, the tracer may be or include $Gd_2O_3$.

After the third fracturing procedure is completed, a fourth fracturing procedure may be initiated. The fourth fracturing procedure may include pumping a fourth non-radioactive-tagged proppant into the wellbore 102. The tracer in the fourth non-radioactive-tagged proppant may be the same as or different from the tracers in the non-radioactive-tagged proppants used in the first stage 110. The tracer in the fourth non-radioactive-tagged proppant may be different from the tracer in the third non-radioactive-tagged proppant. For example, the tracer in the fourth non-radioactive-tagged proppant may be or include, for example, boron (B). For example, the tracer may be or include $B_4C$.

After the fourth fracturing procedure is completed, a fifth fracturing procedure may be initiated. The fifth fracturing procedure may include pumping a fifth non-radioactive-tagged proppant into the wellbore 102. The tracer in the fifth non-radioactive-tagged proppant may be the same as or different from the tracers in the non-radioactive-tagged proppants used in the first stage 110. The tracer in the fifth non-radioactive-tagged proppant may be different from the tracers in the third and/or fourth non-radioactive-tagged proppants. For example, the tracer in the fifth non-radioactive-tagged proppant may be or include, for example, samarium (Sm). For example, the tracer may be or include $Sm_2O_3$. Other example non-radioactive tracers may be or include tracers with a high thermal neutron capture cross-section (e.g., cadmium, iridium, or dysprosium).

In the example of the second stage 120, the fracturing procedures may not occur in/through the desired perforations. For example, in the example of the second stage 120, if the third non-radioactive-tagged proppant (e.g., the Gd-tagged proppant) is found in the fracture induced by the fifth set of perforations 126, the fourth non-radioactive-tagged proppant (e.g., the B-tagged proppant) is found in the fracture induced by the fourth set of perforations 124, and the fifth non-radioactive-tagged proppant (e.g., the Sm-tagged proppant) is found in the fracture induced by the third set of perforations 122, it may be determined that the fifth set of perforations was opened/fractured by the third non-radioactive-tagged proppant, and then the fourth set of perforations 124 was opened/fractured by the fourth non-radioactive-tagged proppant, and then the third set of perforations 122 was opened/fractured by the fifth non-radioactive-tagged proppant.

The same principles described above for a two-stage fracturing operation may be applied in a single-stage fracturing operation, for example, when a first portion of the proppant being pumped (i.e., a lead-in portion) contains the first non-radioactive tracer, and a second, subsequent portion of the proppant being pumped (i.e., a tail-in portion) contains the second non-radioactive tracer. This may provide information that may be used to determine which fractured intervals were more easily fractured and received the first non-radioactive-tagged proppant, and which intervals received the second non-radioactive-tagged proppant. Also, if one of the tracer materials is detected in more than one (e.g., all) of the propped fractures, this may provide information to determine whether or not, in future wells, it may be possible to tag only a portion (e.g., the tail-in portion) of the pumped proppant.

A fracturing design/procedure may include fracturing an entire target zone in a vertical portion of the wellbore from bottom to top, or an entire target zone in a horizontal portion of the wellbore from toe to heel, and there may be no zone left unfractured to improve the ultimate oil or gas recovery. If the entire zone is not fractured as planned (e.g., from bottom to top or from toe to heel or some zone is left unfractured), it may be useful for an operator to know the sequence of fractures or to modify the fracturing design and procedure. Alternatively, in addition to using plugs, the operator may also seal the opened perforations/fractures to fracture the un-opened perforations/unfractured zones, thereby potentially making the fracturing operation costly and risky.

Figure 2:
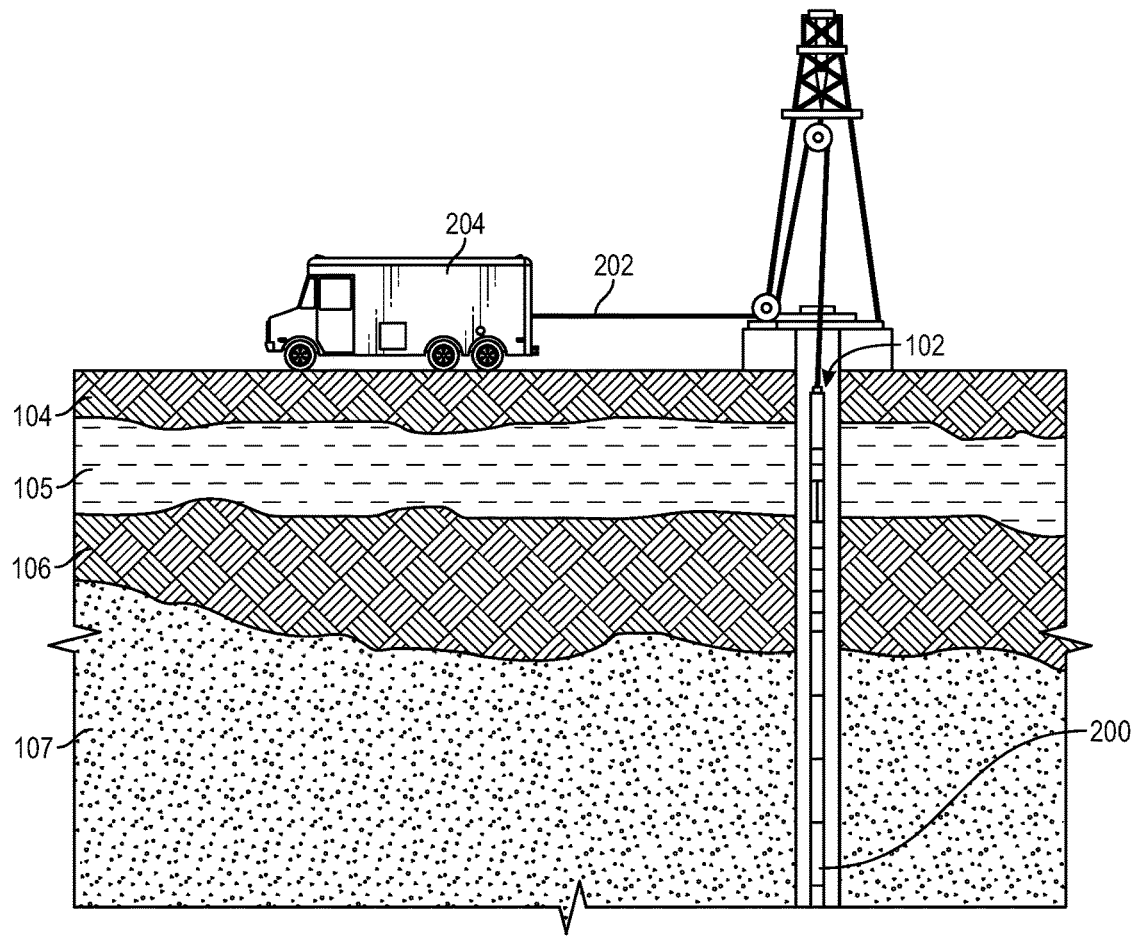
FIG. 2 is a schematic view of a downhole pulsed neutron logging tool in the wellbore, according to an embodiment.

FIG. 2 is a schematic view of a downhole tool 200 in the wellbore 102, according to an embodiment. In at least one embodiment, the downhole tool 200 may include a natural gamma ray detector and/or a pulsed neutron logging tool containing a pulsed neutron source and one or more gamma ray detectors. The downhole tool 200 may be run into the wellbore 102 and obtain measurements before the fracturing procedures and/or after the fracturing procedures. In one example, the downhole tool 200 may be run into the wellbore 102 and obtain measurements before the fracture procedures in the first stage 110 and the second stage 120, and then again after the fracture procedures in the first stage 110 and the second stage 120. In another example, the downhole tool 200 may be run into the wellbore 102 and obtain measurements before the fracture procedures in the first stage 110, after the fracture procedures in the first stage 110 and before the fracture procedure in the second stage 120, and after the fracture procedures in the second stage 120. As shown, the downhole tool 200 may be raised and lowered in the wellbore 102 via a wireline 202. In other embodiments, the downhole tool 200 may instead be raised and lowered by a drill string. The data obtained by the downhole tool 200 may be transmitted to, stored in, and/or analyzed by a computing system 204. The computing system 204 may be positioned in, or otherwise part of, a mobile unit, such as a truck.

Figure 3:
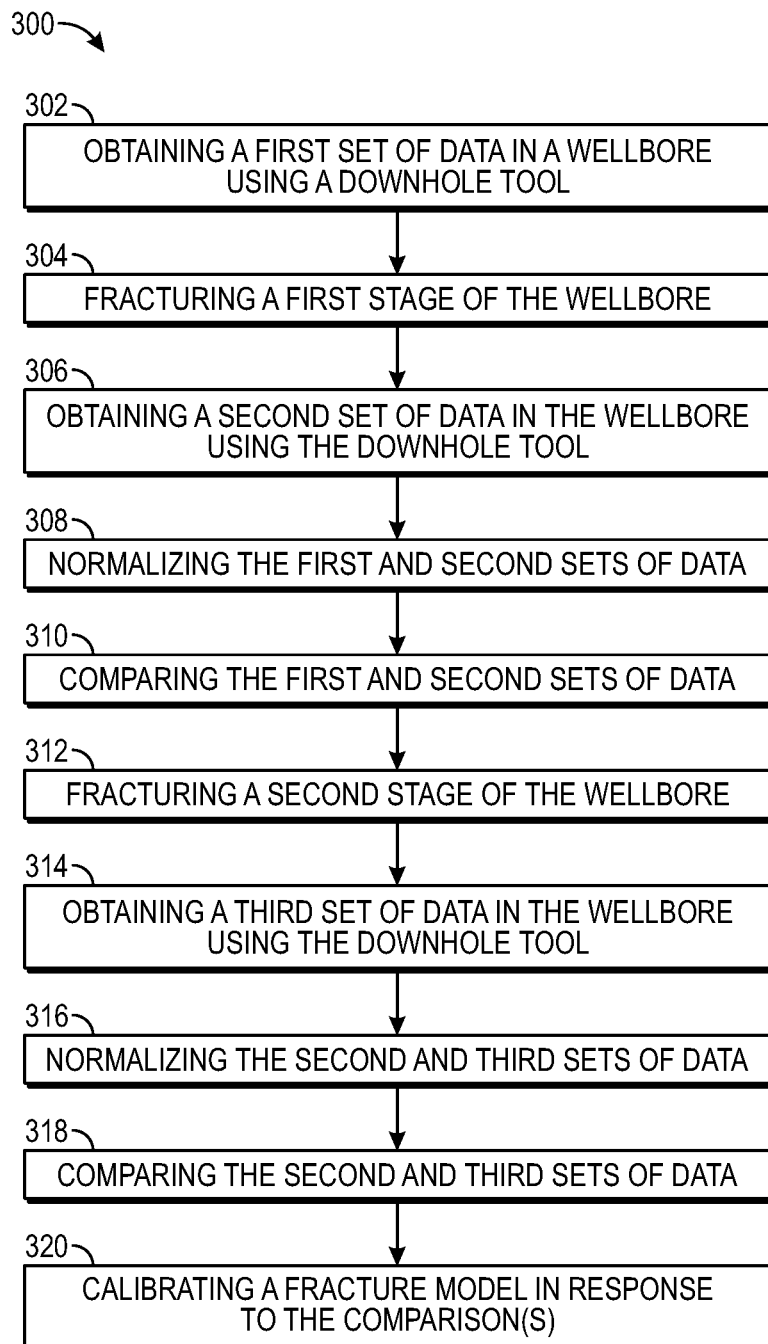
FIG. 3 is a flowchart of a method for evaluating multiple fractures in the wellbore using data obtained by the downhole tool, according to an embodiment.

FIG. 3 is a flowchart of a method 300 for evaluating multiple fractures in the wellbore 102, according to an embodiment. The method 300 may include obtaining (e.g., logging) a first set of data in the wellbore 102 using the downhole tool 200 (e.g., before the first stage 110 is fractured), as at 302. The first set of data may be referred to as a before-fracture log. The first set of data may be or include natural gamma ray, borehole sigma, formation sigma, detector count rates in different time windows, ratios of detector count rates in different time windows, a taggant/tracer element yield (e.g., Gd yield), temperature, wellbore fluid density, wellbore salinity, or a combination thereof. The data collection may begin below the first set of perforations 112 and continue to above (e.g., 200-300 feet above) the fifth set of perforations 126.

The method 300 may also include fracturing the first stage 110 of the wellbore 102, as at 304. In at least one embodiment, fracturing the first stage 110 of the wellbore 102 may include pumping the first non-radioactive-tagged proppant (e.g., the Gd-tagged proppant) into wellbore 102. For example, the first non-radioactive-tagged proppant (e.g., the Gd-tagged proppant) may be intended to flow into the fracture induced by the first set of perforations 112. Fracturing the first stage 110 of the wellbore 102 may also include pumping the second non-radioactive-tagged proppant (e.g., the B-tagged proppant) into wellbore 102. For example, the second non-radioactive-tagged proppant (e.g., the B-tagged proppant) may be intended to flow into the fracture induced by the second set of perforations 114.

The method 300 may also include obtaining (e.g., logging) a second set of data in the wellbore 102 using the downhole tool 200 (e.g., after the first stage 110 is fractured), as at 306. The second set of data may be referred to as the first after-fracture log because it represents data captured after the first stage 110 is fractured. The second set of data may include the same type(s) of data as the first set of data.

The method 300 may also include normalizing the first and/or second set(s) of data, as at 308. Normalizing the first and/or second set(s) of data may account for possible changes inside the wellbore 102 or casing so that the first set of data (i.e., the before-fracture log) overlays with the second set of data (i.e., the after-fracture log) in the depth interval where there is/are no fracture(s) (e.g., in a depth interval above the first stage 110 and/or above the second stage 120).

The method 300 may also include comparing the first set of data (i.e., the before-fracture log) with the second set of data (i.e., the first after-fracture log), as at 310. The comparison may occur after the normalizing. The comparison may include, but is not limited to, comparing the natural gamma ray, borehole sigma, formation sigma, taggant/tracer element yield (e.g., Gd yield), detector count rates in different time windows, ratios of detector count rates in different time windows, or a combination thereof.

In one example, if the comparison shows that the taggant/tracer element yield (e.g., Gd yield) increases proximate to a particular set of perforations (e.g., the first set of perforations 112), it may be determined that the Gd-tagged proppant was successfully placed in the first set of perforations 112. In another example, if the comparison shows that the detector count rates increase in an early time window (e.g., 35 μs to 200 μs or 50 μs to 150 μs) after the neutron bursts (e.g., 0 μs to 30 μs) proximate to a particular set of perforations (e.g., the first set of perforations 112), it may be determined that the Gd-tagged proppant was successfully placed in the first set of perforations 112. In yet another example, if the comparison shows that the detector count rates decrease at a particular rate in a late time window (e.g., 150 μs to 500 μs or 200 μs to 1000 μs) proximate to a particular set of perforations (e.g., the first set of perforations 112), it may be determined that the Gd-tagged proppant was successfully placed in the first set of perforations 112.

In another example, if the comparison shows that the detector count rates decrease in an early time window (e.g., 35 μs to 200 μs or 50 μs to 150 μs) relative to the neutron bursts (e.g., 0 μs to 30 μs) proximate to a particular set of perforations (e.g., the second set of perforations 114), it may be determined that the B-tagged proppant was successfully placed in the second set of perforations 114. In yet another example, if the comparison shows that the detector count rates decrease at a particular rate in a late time window (e.g., 150 μs to 500 μs or 200 μs to 1000 μs) proximate to a particular set of perforations (e.g., the second set of perforations 114), it may be determined that the B-tagged proppant was successfully placed in the second set of perforations 114. The count rates are discussed in greater detail below with reference to FIGS. 4-7.

The method 300 may also optionally include fracturing the second stage 120 of the wellbore 102, as at 312. The wellbore 102 may be fractured after the perforations 122, 124, 126 are formed. In at least one embodiment, fracturing the second stage 110 of the wellbore 102 may include pumping the third non-radioactive-tagged proppant (e.g., the Gd-tagged proppant) into wellbore 102. For example, the third non-radioactive-tagged proppant (e.g., the Gd-tagged proppant) may be intended to flow into the fracture induced by the third set of perforations 122. Fracturing the second stage 120 of the wellbore 102 may also include pumping the fourth non-radioactive-tagged proppant (e.g., the B-tagged proppant) into wellbore 102. For example, the fourth non-radioactive-tagged proppant (e.g., the B-tagged proppant) may be intended to flow into the fracture induced by the fourth set of perforations 124. Fracturing the second stage 120 of the wellbore 102 may also include pumping the fifth non-radioactive-tagged proppant (e.g., the Sm-tagged proppant) into wellbore 102. For example, the fifth non-radioactive-tagged proppant (e.g., the Sm-tagged proppant) may be intended to flow into the fracture induced by the fifth set of perforations 126. The use of three non-radioactive tagged proppants may also be used in a single stage fracturing operation, or a fracturing operation having more than two stages.

The method 300 may also include obtaining (e.g., logging) a third set of data in the wellbore 102 using the downhole tool 200 (e.g., after the second stage 120 is fractured), as at 314. The third set of data may be referred to as the second after-fracture log because it represents data captured after the second stage 120 is fractured. The third set of data may include the same type(s) of data as the first and/or second sets of data.

The method 300 may also include normalizing the first and third sets of data or the second and third sets of data, as at 316. Normalizing the data may account for possible changes inside the wellbore 102 or casing.

The method 300 may also include comparing the second set of data (i.e., the first after-fracture log) with the third set of data (i.e., the second after-fracture log), as at 318. Alternatively, 318 may include comparing the first set of data (i.e., the before-fracture log) with the third set of data (i.e., the second after-fracture log). The comparison may include, but is not limited to, comparing the natural gamma ray, borehole sigma, formation sigma, taggant/tracer element yield (e.g., Gd or Sm yield), detector count rates in different time windows, a ratio of detector count rates in different time windows, or a combination thereof.

In one example, if the comparison shows that the taggant/tracer element yield (e.g., Gd yield) increases proximate to a particular set of perforations (e.g., the fifth set of perforations 126), it may be determined that the Gd-tagged proppant was successfully placed in the fifth set of perforations 126. In another example, if the comparison shows that the taggant/tracer element yield (e.g., Sm yield) increases proximate to a particular set of perforations (e.g., the third set of perforations 122), it may be determined that the Sm-tagged proppant was successfully placed in the third set of perforations 122. As will be described below with reference to FIG. 9, the Gd-tagged proppant and the Sm-tagged proppant may be distinguished from one another using spectral data processing methods in determining the elemental yields of Gd and Sm.

In another example where gadolinium and boron are the two taggants, if the comparison shows that the detector count rates increase in an early time window (e.g., 35 μs to 200 μs or 50 μs to 150 μs) proximate to a particular set of perforations (e.g., the fifth set of perforations 126), it may be determined that the Gd-tagged proppant was successfully placed in the fifth set of perforations 126. In yet another example, if the comparison shows that the detector count rates decrease at a particular rate in a late time window (e.g., 150 μs to 500 μs or 200 μs to 1000 μs) proximate to a particular set of perforations (e.g., the fifth set of perforations 126), it may be determined that the Gd-tagged proppant was successfully placed in the fifth set of perforations 126.

In the example with the Gd and B taggants, if the comparison shows that the detector count rates decrease in an early time window (e.g., 35 μs to 200 μs or 50 μs to 150 μs) proximate to a particular set of perforations (e.g., the third set of perforations 122), it may be determined that the B-tagged proppant was successfully placed in the third set of perforations 122. In yet another example, if the comparison shows that the detector count rates decrease more in a late time window (e.g., 150 μs to 500 μs or 200 μs to 1000 μs) proximate to a particular set of perforations (e.g., the third set of perforations 122), it may be determined that the B-tagged proppant was successfully placed in the third set of perforations 122. Also, because a ratio of the count rate change in the early time window relative to the later time window between the before-frac and after-frac measurements for a gadolinium-tagged proppant is different from the corresponding count change for a boron-tagged proppant, an analysis of the ratio measurement in the fractured zones 122, 126 would indicate which taggant was present (e.g. the ratio is negative for Gd-tagged proppant but positive for B-tagged proppant in a fractured zone).

The method 300 may also include calibrating a fracture model in response to the comparisons, as at 320. The fracture model may be calibrated to reduce the uncertainties in fracture procedure designs. This may lead to more efficient fracturing procedures and improve the ultimate oil or gas recovery. For example, the lead-in portion of the proppant may not include a tracer, and only the tail-in portion of the proppant may include the tracer. In another embodiment, the particles size(s) in the proppant(s) may be varied in response to the comparisons for future fracture operations.

Figure 4:
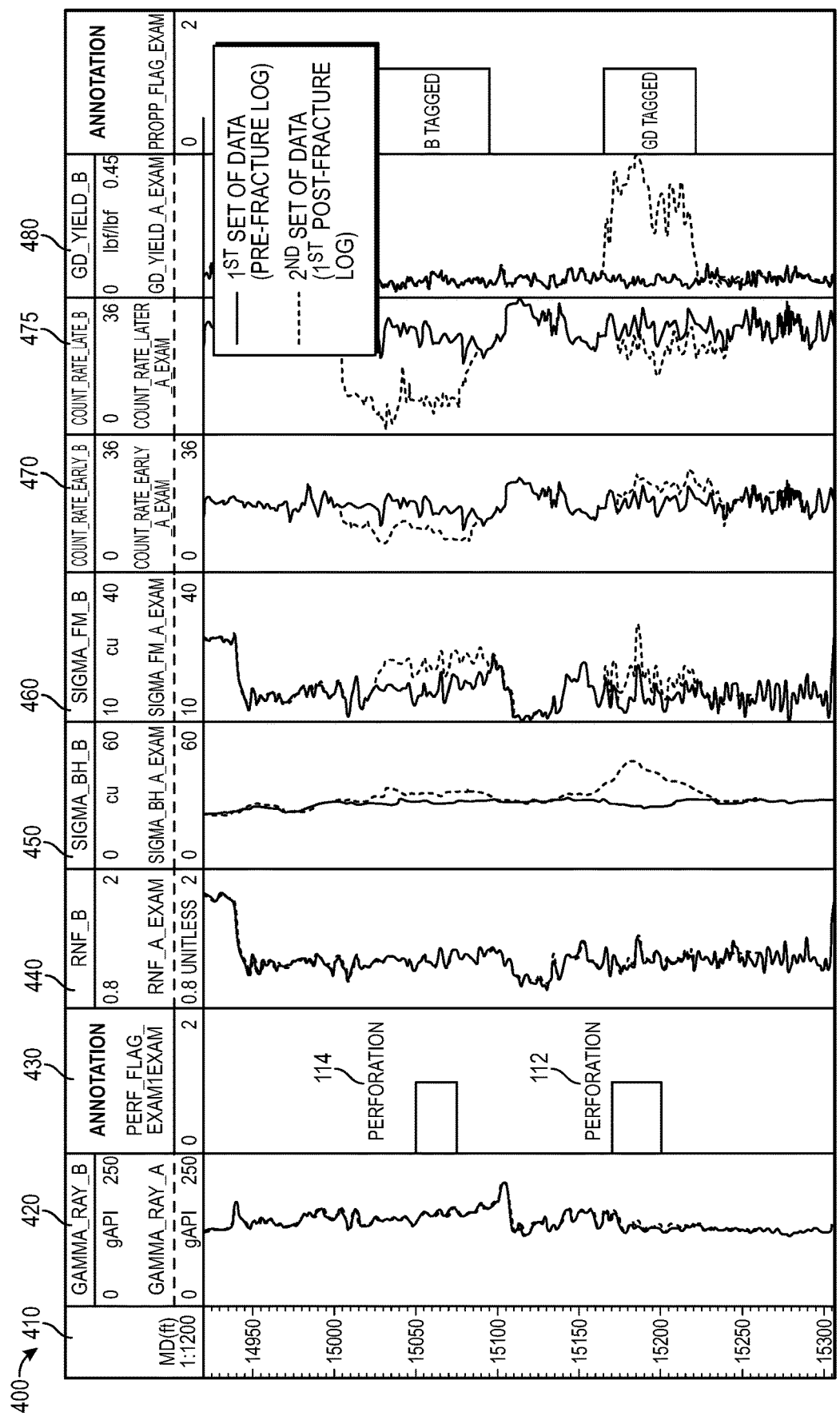
FIG. 4 is a graph (e.g., a log) showing data obtained by the downhole pulsed neutron tool in the wellbore before and after a stage is fractured with a gadolinium-tagged proppant and a boron-tagged proppant, according to an embodiment.

FIG. 4 is a graph 400 showing the first and second sets of data obtained by the downhole tool 200 in the wellbore 102 (i.e., before and after the first stage 110 is fractured), according to an embodiment. The graph 400 has columns showing the measured depth 410, the natural gamma ray 420, the perforation intervals 430, the ratio of count rates from near and far detector 440, the borehole sigma 450, the formation sigma 460, the count rate in an early time window (e.g., 50 μs to 150 μs) 470, the count rate in a late time window (e.g., 200 μs to 1000 μs) 475, and the taggant/tracer element (e.g., Gd) yield 480.

As shown, the after-fracture borehole sigma may be larger proximate to both sets of perforations 112, 114 after the first stage 110 is fractured, and the after-fracture formation sigma may be larger proximate to both sets of perforations 112, 114 after the first stage 110 is fractured. The count rates in the early time window may increase proximate to the first set of perforations 112 and decrease proximate to the second set of perforations 114 after the first stage 110 is fractured. The count rates in the late time window may decrease proximate to both sets of perforations 112, 114 in differing relative amounts after the first stage 110 is fractured. The taggant/tracer element (e.g., Gd) yield may be larger proximate to the first set of perforations 112 after the first stage 110 is fractured, and there may be substantially no change in the taggant/tracer element (e.g., Gd) yield proximate to the second set of perforations 114 after the first stage 110 is fractured. From any portion (or all) of this data, it may be determined that the Gd-tagged proppant flowed into the fracture induced by the first set of perforations 112, and the B-tagged proppant flowed into the fracture induced by the second set of perforations 114.

Figure 5:
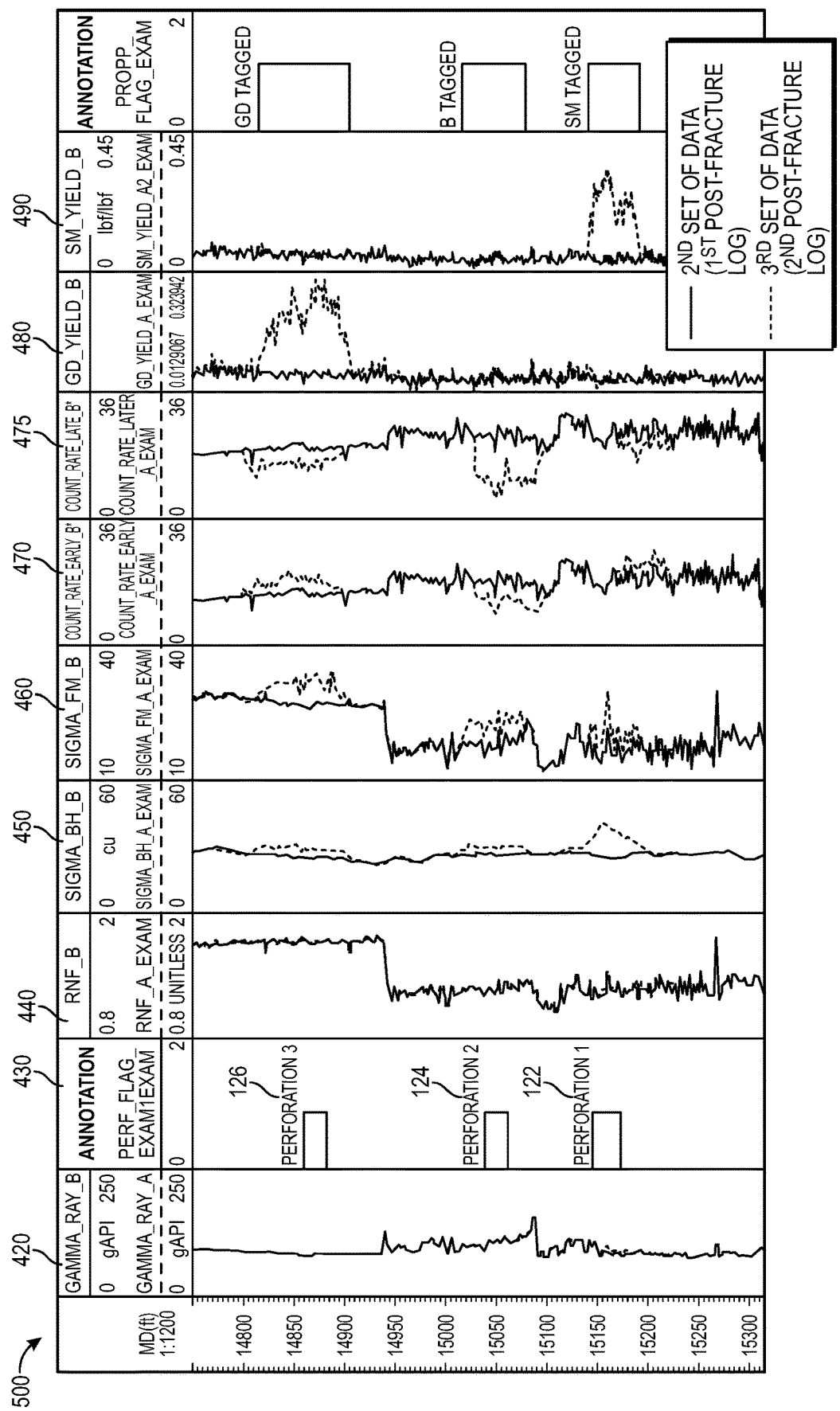
FIG. 5 is graph (e.g., a log) showing data obtained by the downhole pulsed neutron tool in the wellbore before and after a stage is fractured, with a gadolinium-tagged proppant, a boron-tagged proppant, and a samarium-tagged proppant, according to an embodiment.

FIG. 5 is a graph 500 showing the second and third sets of data captured by the downhole tool 200 in the wellbore 102 (i.e., before and after the second stage 120 is fractured), according to an embodiment. FIG. 5 may also describe multiple perforations and multiple tracers in a single stage fracture procedure. As shown, the borehole sigma may be larger proximate to all three sets of perforations 122, 124, 126 after the second stage 120 is fractured, and the formation sigma may be larger proximate to all three sets of perforations 122, 124, 126 after the second stage 120 is fractured. In the example of FIG. 5, the downhole tool 200 is able to measure the Gd yield 480 and the Sm yield 490. As shown, the Gd yield 480 may increase proximate to the fifth set of perforations 126, and the Sm yield 490 may increase proximate to the third set of perforations 122. The count rates in the early time window may increase proximate to the third and fifth sets of perforations 122, 126 and decrease proximate to the fourth set of perforations 124 after the second stage 120 is fractured, and the count rates in the late time window may decrease proximate to all three sets of perforations 122, 124, 126 after the second stage 120 is fractured. The taggant/tracer element (e.g., Gd) yield may be larger proximate to the fifth set of perforations 126 after the second stage 120 is fractured, and there may be no change in the taggant/tracer element (e.g., Gd) yield proximate to the third or fourth set of perforations 122 and 124 after the second stage 120 is fractured. The taggant/tracer element (e.g., Sm) yield may be larger proximate to the third set of perforations 122 after the second stage 120 is fractured, and there may be no change in the taggant/tracer element (e.g., Sm) yield proximate to the fourth or fifth sets of perforations 124 and 126 after the second stage 120 is fractured. From any portion (or all) of this data, it may be determined that the B-tagged proppant flowed into the fracture induced by the fourth set of perforations 124, because the sigma-formation and sigma-borehole logs increase after the fracture procedure indicating that a non-radioactive tag is present, but neither Gd nor Sm is seen on the yield logs, which indicates that neither Gd nor Sm is present in perforations 124. The presence of boron is also indicated in the fourth set of perforations 124 because there is a decrease in the early time window count rate in perforations 124. An increase in the early time window count rate may be observed if Gd or Sm were the taggant present in perforations 124.

Although not shown, a similar graph may be generated with the first and third sets of data. From this data analysis, it may be determined that the Gd-tagged proppant flowed into the fracture induced by the fifth set of perforations 126, the B-tagged proppant flowed into the fracture induced by the fourth set of perforations 124, and the Sm-tagged proppant flowed into the fracture induced by the third set of perforations 122.

Figure 6:
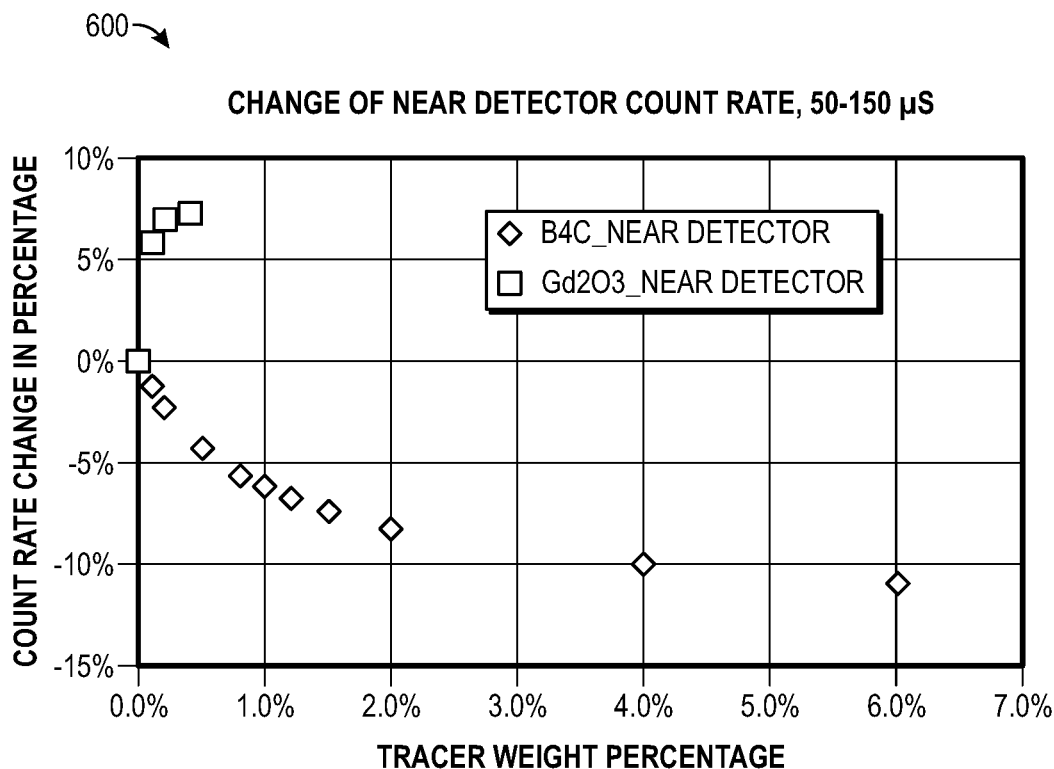
FIG. 6 is a graph showing modeled pulsed neutron logging tool detector capture gamma ray count rate changes in an early time window (e.g., 50 μs to 150 μs) relative to the timing of the neutron burst (e.g., 0 μs to 30 μs) with gadolinium and boron used as non-radioactive proppant tags in a fractured formation, according to an embodiment.

FIG. 6 is a graph 600 showing the detector count rates in an early time window (e.g., 50 μs to 150 μs) after the end of each neutron burst (e.g. 0 to 30 μs), according to an embodiment. More particularly, FIG. 6 shows the detector count rates for the Gd-tagged proppant and the B-tagged proppant in the early time window as a function of different taggant concentrations (weight percentages) in the proppant particles. As may be seen, the count rate for the Gd-tagged proppant increases, whereas the count rate for the B-tagged proppant decreases, regardless of the proppant concentrations. In one example, the proppant concentrations may be about 0.4% for the Gd-tagged proppant and about 1.0% for the B-tagged proppant.

Figure 7:
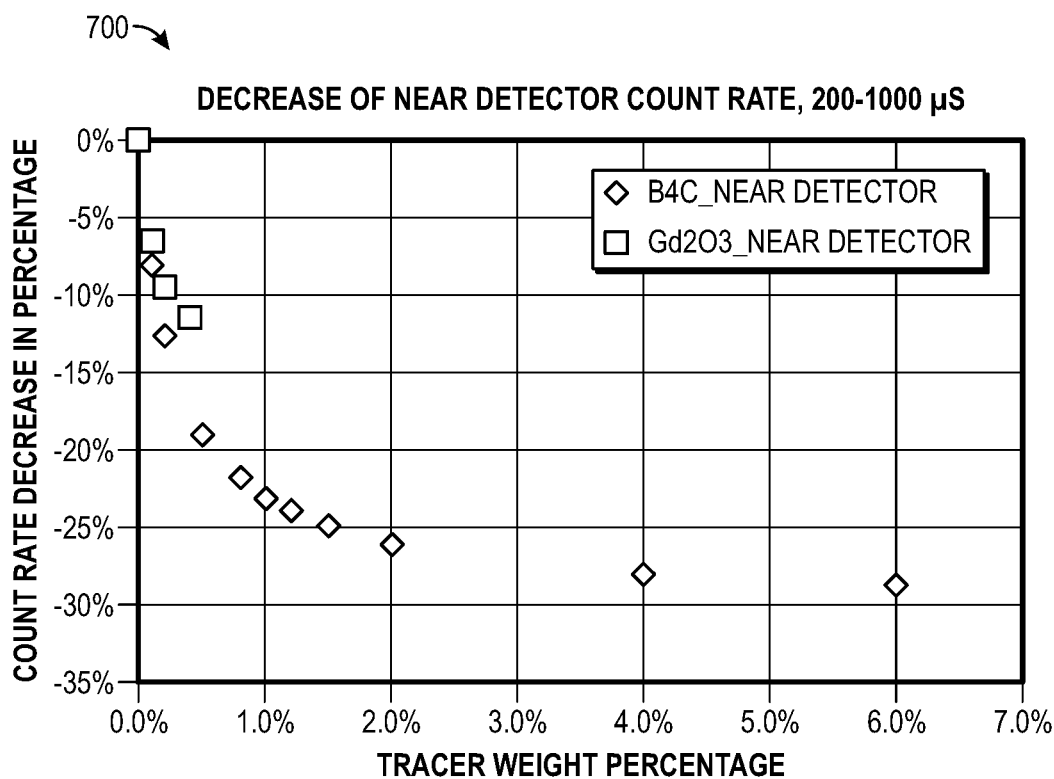
FIG. 7 is a graph showing modeled pulsed neutron logging tool detector capture gamma ray count rate changes in a late time window (e.g., 200 μs to 1000 μs) relative to the neutron bursts (e.g., 0 μs to 30 μs) with gadolinium and boron used as non-radioactive proppant tags in a fractured formation, according to an embodiment.

FIG. 7 is a graph 700 showing the detector count rates in a late time window (e.g., 200 μs to 1000 μs) after the end of each neutron burst, according to an embodiment. More particularly, FIG. 7 shows the detector count rates for the Gd-tagged proppant and the B-tagged proppant in the late time window as a function of taggant concentration in the proppant particles. As may be seen, the count rates for both the Gd-tagged proppant and the B-tagged proppant decrease, regardless of the proppant concentrations. However, the count rate of the B-tagged proppant may decrease different (e.g., larger) amounts/percentages than the Gd-tagged proppant. Again, the proppant concentrations may be about 0.4% for the Gd-tagged proppant and about 1.0% for the B-tagged proppant.

FIG. 8 is a table 800 showing modeled changes on pulsed neutron logging borehole sigma, formation sigma, detector count rates in different time windows, and a ratio of detector count rate changes in two time windows (e.g. 50-150 μs to 200-1000 μs) from a near-spaced detector for a Gd-tagged proppant, a B-tagged proppant, and a Sm-tagged proppant, for nominal taggant concentrations used in typical field applications. These concentrations result in similar increases in a propped fracture of the formation capture cross-section am (all three increase approximately 10% in the table). On the other hand, the detector count rates in the early time window increase for both Gd and Sm taggants, whereas the count rate decreases for a boron taggant. This is due in part to the fact that both Gd and Sm emit significant high energy capture gamma radiation following thermal neutron capture, whereas boron does not. In the later time windows (e.g., 200 μs to 1000 μs or 400 μs to 1000 μs) relative to the time of the neutron bursts, the detector count rates decrease for all three taggant materials, and the relative decrease is larger for boron. Also shown in FIG. 8 are the ratio of the detector count rate changes in the early time window relative to that in a later time window for all three taggant materials. It can be seen that the ratios are similar when Gd and Sm taggants are present (e.g., negative); however, the ratio is significantly different when boron is the taggant (e.g., positive). Thus, to distinguish the signal from the B-tagged proppant from signals from either Gd or Sm-tagged proppants, the operator may use the different boron tag signature in the early time window count rate or the more pronounced ratio of count rate changes in different time windows when tagged proppant is present. It can also be seen from the similarity of the data in the table for Gd and Sm that an additional discriminator is required to distinguish the presence of a Gd taggant from a Sm taggant.

Figure 9:
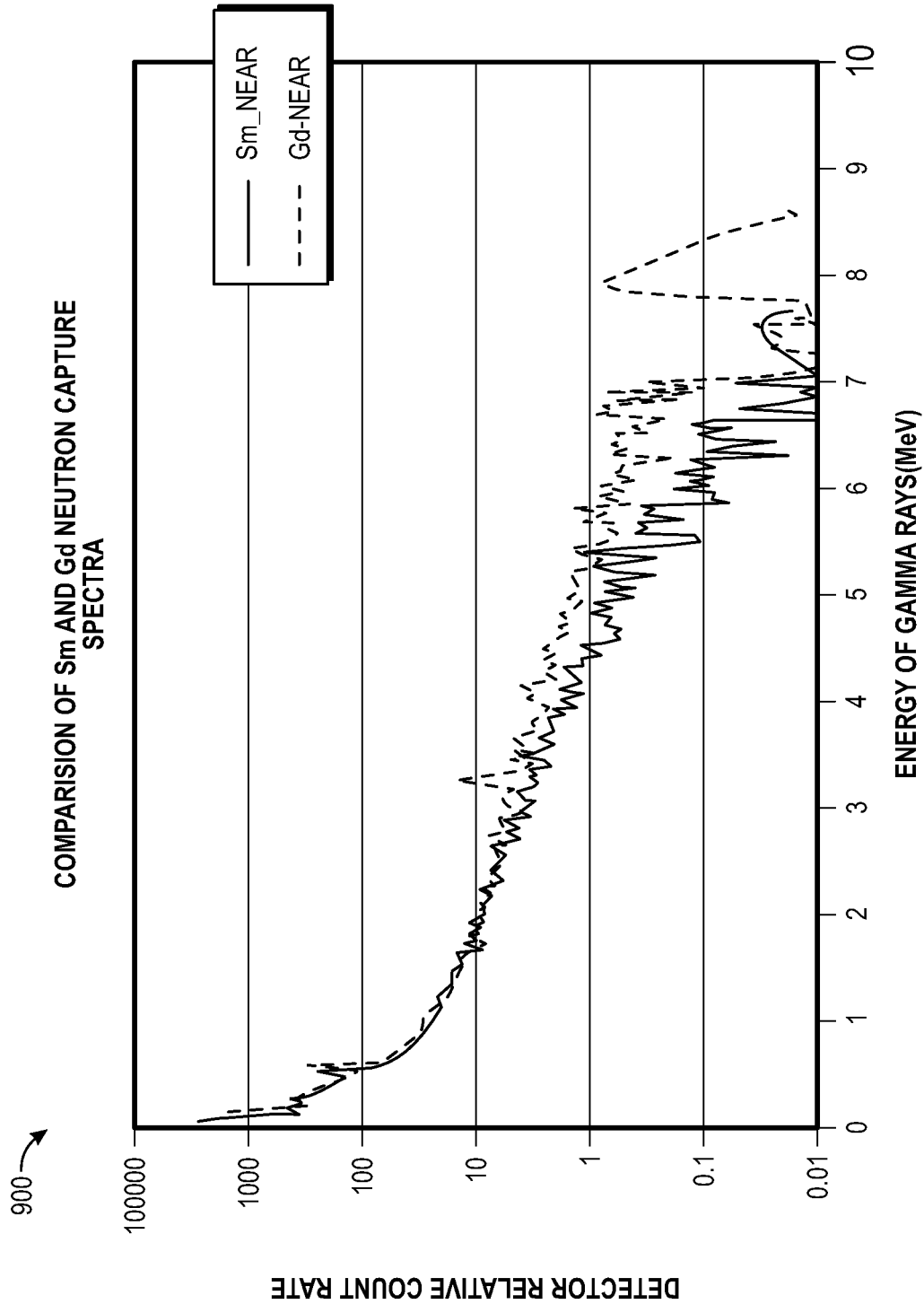
FIG. 9 is a graph showing the capture gamma spectral differences between a Gd-tagged proppant and a Sm-tagged proppant in a downhole propped fracture, according to an embodiment.

FIG. 9 is a graph 900 showing the modeled pulsed neutron capture gamma ray energy spectra illustrating the differences between Gd-tagged proppant and Sm-tagged proppant in a downhole induced fracture. As shown, the Gd-tagged proppant and the Sm-tagged proppant produce somewhat distinctive capture gamma ray spectra. Therefore capture gamma ray spectroscopy processing techniques may be used to determine the yields from each of the two different taggants (Gd and Sm), and the differences, and hence, the yields of elements may indicate which perforations contained which of these tagged proppants.

In a fracturing operation utilizing one or both of these two taggants (e.g., Gd and Sm), if neither of these spectrally-distinct non-radioactive tracers are otherwise present in the downhole formations and wellbore region, then it may also be possible to eliminate or omit the pre-fracture data set and instead utilize the two yields (or yields above statistical background levels) determined from the after-fracture data set, perhaps in combination with other PNC log parameters, in the process to determine the locations within the fractured zones where each of the tagged proppant materials is present.

The multiple non-radioactive tracers may also be used to evaluate frac-packing. Frac-packing is a technique that merges two completion processes: hydraulic fracturing and gravel packing. After frac-packing, the quality of the gravel pack may be evaluated to ensure that successful sand control has been obtained. The fracture height in the formation may also be determined behind the gravel pack. Multiple tracers may be used to evaluate frac-packing procedures for a wellbore with one or more sets of perforations.

In at least one embodiment, two sets of proppant particles having different sizes may be used in a fracturing operation or a frac-packing operation. For example, the lead-in portion of the proppant may have smaller particles, and the tail-in portion of the proppant may have larger particles. The smaller particles may be tagged with one non-radioactive tracer, and the larger particles may be tagged with a different non-radioactive tracer. Analysis of fracturing data may be performed to determine fractures where the smaller versus larger proppant particles are located, and can also be useful in designing future fracturing procedures. This may also be useful information in frac-pack evaluation or for developing future frac-pack procedures. For example, an operator may determine whether the larger or smaller proppant particles are preferentially located in the gravel packed region in the borehole or the fractured zone(s) out in the formation.

In at least one embodiment, it may be useful to tag the proppant pumped in a fracturing operation with one or more non-radioactive tracers, and the frac fluid pumped downhole containing the proppant with a different non-radioactive tracer, also having a high thermal neutron capture cross-section. The frac fluid tracer/taggant may be dissolved or otherwise contained in the frac fluid being pumped (e.g., water-soluble non-radioactive boron tracers may include boric acid or borax). The tagged proppant and the tagged frac fluid may be pumped into the wellbore simultaneously or at different times. If the water-soluble tracer does contain boron, the boron tracer signals in the frac fluid may also be augmented by any boron otherwise present in the frac fluid (e.g., some cross-linked frac fluids contain boron compounds). The ability to independently locate the tracers in the frac fluid versus the tracers in the proppant may allow determination of any zones which were fractured, but not effectively propped. This data may also provide useful information in the overall fracture evaluation and design processes.

In at least one embodiment, one or more non-radioactive tracers may be used in combination with a radioactive (R/A) tracer/taggant. For example, the frac fluid may be tagged with a radioactive tracer, and the proppant may be tagged with one or more non-radioactive tracers. This may reduce the number of non-radioactive tracers used, and also make any spectral analysis of the radioactive tag signals and/or the non-radioactive tag signals easier and more accurate, because the R/A measurement may be made by a different detector in the logging tool than the detector(s) used to process the data from the non-radioactive tag. Conventionally, if an operator wanted to distinguish how much of two or more R/A taggants are in the borehole region versus the formation, the spectral data processing is very complex and can be highly inaccurate. That is not true if one is using only one R/A tag, where gamma ray spectroscopy can more effectively be used to distinguish that taggant in the borehole region from taggant in the formation fractures. Hence, combining a R/A taggant with a non-radioactive taggant may permit independent processing and methods in obtaining the two taggant determinations and may permit more accurate analysis from the R/A data, since the second R/A tag can be eliminated, and thus would not be present to interfere with or otherwise introduce inaccuracy into the answers relating the first R/A taggant.

Isolating two R/A taggants involves using capture gamma ray spectroscopy, and conventionally, a specialized tool is used to make the measurements. Using one R/A taggant with one non-radioactive taggant does not use capture gamma ray spectroscopy, whether using a PNC tool to detect the non-radioactive taggant or a compensated neutron tool. Any of the non-radioactive taggants may be used (e.g., Gd, Sm, or B). In addition, an operator does not require the use of different tools to detect an R/A taggant and a non-radioactive taggant. Both can be detected using the same pulsed neutron tool used to detect the non-radioactive taggant. Even a compensated neutron tool may be used to isolate signals from an R/A tag and a single non-radioactive tag. The natural gamma ray detector in the pulsed neutron or compensated neutron tool may be used to detect the R/A taggant in the fractures by comparing the before-frac natural gamma ray log with the after-frac natural gamma ray log. The gamma ray log increase on the after-frac log may be due to the gamma rays from the R/A taggant. This natural gamma detector is not used in determining/analyzing the non-radioactively tagged proppant data in determining the non-radioactive proppant signal(s).

A pulsed neutron tool, if so equipped, may also make use of the ability to utilize capture gamma spectroscopy (when available) to improve the non-radioactive taggant data analysis by computing the taggant yield(s). In that case, it would be possible to distinguish two or three non-radioactive taggants (e.g., Gd, Sm, and/or B), as illustrated in FIGS. 4 and 5, if it were desired to use more than two taggants (e.g., one R/A tag and two or three non-radioactive tags). A positive cost saving in using a R/A taggant with one or more non-radioactive taggants is that an additional logging tool would not be required to detect the R/A taggant. All the taggants may be located using the same pulsed neutron tool (or compensated neutron tool for one R/A tag and one non-radioactive tag) currently in use for non-radioactive taggant data processing. Also, during the logging operation, no additional logging passes up the borehole would be required to detect the presence of the R/A tag, since all the tag signals are simultaneously obtained.

In another embodiment, a method for evaluating induced fractures in a wellbore using radioactive and non-radioactive tags may include pumping a proppant into the wellbore, wherein the proppant includes a first tracer that is not radioactive. A second tracer may also be pumped into the wellbore before, simultaneously with, and/or after the proppant is pumped into the wellbore. The second tracer is radioactive. A first set of data may be obtained in the wellbore using a downhole logging tool after the first and second tracers are pumped into the wellbore. The first set of data may be analyzed to determine locations of the first and second tracers in formation fractures. The method may also include capturing a second set of data with the downhole logging tool prior to pumping the proppant and the second tracer, and comparing the first and second sets of data to determine the locations of the first and second tracers in the formation fractures.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

What is claimed is:

1. A method for evaluating induced fractures in a wellbore, comprising:
    obtaining a first set of data in a wellbore using a downhole logging tool, wherein the downhole logging tool comprises a pulsed neutron logging tool;
    pumping a first proppant into the wellbore, after the first set of data is captured, wherein the first proppant comprises a first tracer that is not radioactive, wherein the first tracer includes an element selected from the group consisting of gadolinium, boron, and samarium;
    pumping a second proppant into the wellbore, after the first proppant is pumped into the wellbore, wherein the second proppant comprises a second tracer that is not radioactive, wherein the second tracer includes a different element selected from the group consisting of gadolinium, boron, and samarium and wherein the second tracer is different than the first tracer;
    obtaining a second set of data in the wellbore using the downhole tool after the first and second proppants are pumped into the wellbore; and
    comparing the first and second sets of data, wherein comparing the first and second sets of data comprises comparing detector count rate changes between the first and second sets of data in an early time window after neutron bursts, wherein the early time window is from about 35 μs to about 150 μs, and further comprising:
        determining, based on the comparison of the detector count rate changes, that one of the first and second tracers comprises boron and is present in first formation fractures when the detector count rate decreases proximate to a first set of perforations adjacent to the first formation fractures.

2. The method of claim 1, wherein the first set of data, the second set of data, the comparison of the first and second sets of data, or a combination thereof comprise:
    borehole sigma data,
    formation sigma data,
    ratio data of count rate changes in different time windows after the neutron bursts,
    elemental yield data of the first tracer, the second tracer, or both, or
    a combination thereof.

3. The method of claim 1, further comprising determining, based on the comparison of the first and second sets of data, that the first proppant is present in formation fractures proximate to a first set of perforations in the wellbore, and the second proppant is present in formation fractures proximate to a second set of perforations in the wellbore when an elemental yield of the first tracer increases proximate the first set of perforations, the elemental yield of the second tracer increases proximate the second set of perforations, or both.

4. The method of claim 1, further comprising determining, based on the comparison of the detector count rate changes, that the other of the first and second tracers comprises gadolinium or samarium and is present in second formation fractures when the detector count rate increases proximate a second set of perforations adjacent to the second formation fractures.

5. The method of claim 1, wherein comparing the first and second sets of data comprises comparing detector count rate changes between the first and second sets of data in a late time window after neutron bursts, wherein the late time window is from about 200 μs to about 1,000 μs.

6. The method of claim 1, further comprising pumping a third proppant into the wellbore, wherein the third proppant comprises a third tracer that is not radioactive, wherein the third tracer includes a third element selected from the group consisting of gadolinium, boron, and samarium, and wherein the third tracer is different from the first and second tracers.

7. The method of claim 1, further comprising determining, based on the comparison of the first and second sets of data, that the first proppant is present in formation fractures proximate to a first set of perforations in the wellbore, and the second proppant is present in the formation fractures proximate to a second set of perforations in the wellbore when:
    proximate to the first set of perforations: a borehole sigma increased, a formation sigma increased, a detector count rate in the early time window increased, the detector count rate in a late time window decreased, an elemental yield of the first tracer increased, or a combination thereof, wherein the late time window is from about 200 μs to about 1,000 μs; and proximate to the second set of perforations: the borehole sigma increased, the formation sigma increased, the detector count rate in the early time window decreased, the detector count rate in the late time window decreased, or a combination thereof.

8. The method of claim 1, wherein the first proppant comprises a first plurality of particles, the second proppant comprises a second plurality of particles, and the average size of the first plurality of particles is different from the average size of the second plurality of particles.

9. The method of claim 1, wherein the first proppant comprises a lead-in portion, and the second proppant comprises a tail-in portion.

10. A method for evaluating induced fractures in a wellbore, comprising:

obtaining a first set of data in a wellbore using a downhole logging tool, wherein the downhole logging tool comprises a pulsed neutron logging tool;

pumping a first proppant into the wellbore, after the first set of data is captured, wherein the first proppant comprises a first tracer that is not radioactive, wherein the first tracer includes an element selected from the group consisting of gadolinium, boron, and samarium;

pumping a second proppant into the wellbore, after the first proppant is pumped into the wellbore, wherein the second proppant comprises a second tracer that is not radioactive, wherein the second tracer includes a different element selected from the group consisting of gadolinium, boron, and samarium and wherein the second tracer is different than the first tracer;

obtaining a second set of data in the wellbore using the downhole tool after the first and second proppants are pumped into the wellbore; and comparing the first and second sets of data, wherein comparing the first and second sets of data comprises computing a ratio of a detector count rate change in an early time window after neutron bursts relative to the detector count rate change in a late time window after the neutron bursts, wherein the early time window is from about 35 μs to about 150 μs and the late time window is from about 200 μs to about 1,000 μs.

11. The method of claim 10, wherein the ratio is positive in the presence of boron, and negative in the presence of gadolinium or samarium.

* * * * *